US008636848B2

(12) United States Patent
Faure et al.

(10) Patent No.: US 8,636,848 B2
(45) Date of Patent: Jan. 28, 2014

(54) VACUUMABLE GEL FOR DECONTAMINATING SURFACES AND USE THEREOF

(75) Inventors: Sylvain Faure, Saint-Didier (FR); Paul Fuentes, Manosque (FR); Yvan Lallot, Bollène (FR)

(73) Assignees: Commissariat a l'Energie Atomique, Paris (FR); Areva NC, Paris (FR)

( * ) Notice: Subject to any disclaimer, the term of this patent is extended or adjusted under 35 U.S.C. 154(b) by 804 days.

(21) Appl. No.: 12/088,901

(22) PCT Filed: Oct. 3, 2006

(86) PCT No.: PCT/EP2006/066976
§ 371 (c)(1), (2), (4) Date: Apr. 1, 2008

(87) PCT Pub. No.: WO2007/039598
PCT Pub. Date: Apr. 12, 2007

(65) Prior Publication Data
US 2008/0228022 A1 Sep. 18, 2008

(30) Foreign Application Priority Data
Oct. 5, 2005 (FR) ...................................... 05 52999

(51) Int. Cl.
*B01J 13/00* (2006.01)
*C11D 3/12* (2006.01)
*A62D 3/38* (2007.01)
*G21F 9/16* (2006.01)
*C11D 17/08* (2006.01)

(52) U.S. Cl.
USPC ........ 134/3; 134/10; 134/21; 588/14; 588/18; 588/901; 510/110; 516/111; 516/112

(58) Field of Classification Search
USPC ...................... 516/111, 112; 588/14, 18, 901; 510/110; 134/3, 10, 21
See application file for complete search history.

(56) References Cited

U.S. PATENT DOCUMENTS 3,997,460 A * 12/1976 Sirine et al. .................. 510/191
4,561,993 A * 12/1985 Choy et al. .................... 510/397

(Continued)

FOREIGN PATENT DOCUMENTS

EP 0 589 781 A1 * 3/1994
EP 0 674 323 A1 * 9/1995

(Continued)

OTHER PUBLICATIONS

"Cab-O-Sil® Properties and Functions", Cabot Corporation, Boston MA, (1974—Month unavailable), pp. 1-38.*

(Continued)

*Primary Examiner* — Daniel S Metzmaier
(74) *Attorney, Agent, or Firm* — Brinks Gilson & Lione

(57) ABSTRACT

The present invention relates to a vacuumable gel and the gel use to decontaminate surfaces, for example, radioactive decontamination. The gel is composed of a colloidal solution comprising:

from 5 to 25 wt % of an inorganic viscosity modifier;
from 0.01 to 0.2 wt % of a surfactant, preferably, a surfactant in an amount strictly below 0.1 wt %, wt % relative to the total weight of the gel;
from 0.5 to 7 mol, per liter of gel, of an inorganic acid or base; and
optionally from 0.05 to 1 mol, per liter of gel, of an oxidizer having a standard redox potential $E_0$ greater than 1.4 V in a strong acid medium or of the reduced form of this oxidizer;
the remainder being water.

The gel may be applied, by spraying, to a surface to be decontaminated, and removed in the form of dry residues by suction or brushing after drying.

20 Claims, 3 Drawing Sheets

(56) References Cited

U.S. PATENT DOCUMENTS

| | | | | |
|---|---|---|---|---|
| 6,203,624 | B1 * | 3/2001 | Bargues et al. | 516/99 |
| 6,475,296 | B1 | 11/2002 | Gauchon et al. | |
| 6,689,226 | B1 * | 2/2004 | Cheung et al. | 134/41 |
| 7,662,754 | B2 * | 2/2010 | Faure et al. | 507/213 |
| 7,713,357 | B2 * | 5/2010 | Faure et al. | 134/6 |
| 7,718,010 | B2 * | 5/2010 | Faure et al. | 134/6 |
| 2004/0175505 | A1 | 9/2004 | Faure et al. | |

FOREIGN PATENT DOCUMENTS

| | | | |
|---|---|---|---|
| FR | 2 656 949 | A1 * | 7/1991 |
| FR | 2 746 328 | | 9/1997 |
| FR | 2 781 809 | | 2/2000 |
| FR | 2 827 530 | | 1/2003 |
| WO | WO 03/008529 | A * | 1/2003 |

OTHER PUBLICATIONS

Derwent Abstract, week 199939, London: Derwent Publications Ltd., AN 1994-103362, Class K07, EP 0 589 781 A1, (Commissariat Energie Atomique), abstract.*

Derwent Abstract, week 199137, London: Derwent Publications Ltd., AN 1991-269274, Class E37, FR 2 656 949 A1, (Commissariat Energie Atomique), abstract.*

Derwent Abstract, week 199819, London: Derwent Publications Ltd., AN 1995-330116, Class A97, EP 0 674 323 A1, (Commissariat Energie Atomique), abstract.*

Machine Translation of Publ. No. EP0589781 (A1), published Mar. 1994, European patent Office, obtained online @ http://ep.espacenet.com/?locale=EN_ep (Downloaded Dec. 13, 2010).*

Machine Translation of Publ. No. FR 2 656 949 A1, published Jul. 1991, European patent Office, obtained online @ http://ep.espacenet.com/?locale=EN_ep (Downloaded Dec. 13, 2010).*

Machine Translation of Publ. No. EP 0 674 323 A1, published Sep. 1995, European patent Office, obtained online @ http://ep.espacenet.com/?locale=EN_ep (Downloaded Dec. 13, 2010).*

Search Report prepared Jun. 8, 2006 by the French Patent Office in a corresponding prior application, FR 05 52999, filed Oct. 5, 2005.

English language translation of the International Preliminary Report on Patentability from corresponding International Application No. PCT/EP2006/066976, mailed Sep. 18, 2008).

* cited by examiner

VACUUMABLE GEL FOR DECONTAMINATING SURFACES AND USE THEREOF

This application is a National Stage application of International Application No. PCT/EP2006/066976 filed Oct. 3, 2006, the entire contents of which is hereby incorporated herein by reference. This application also claims the benefit under 35 U.S.C. §119 of French Patent Application No. 05 52999, filed Oct. 5, 2005, the entire contents of which is hereby incorporated herein by reference.

TECHNICAL BACKGROUND

The present invention relates to a vacuumable gel that can be used for decontaminating surfaces, and also to the use of this gel.

The decontamination may be, for example, a radioactive decontamination.

The gel may be used on all sorts of surfaces to be treated, such as metallic surfaces, plastic surfaces, glassy surfaces and/or porous surfaces (for example concrete surfaces).

PRIOR ART

The gels of the prior art do not dry, or do so only after several tens of hours, and must all be removed after a few hours by rinsing with water. In this case, the rinsing also makes it possible to interrupt the action of the gel on the wall and to control the duration of action of the gel.

Rinsing has the drawback of generating liquid effluents of the order of 10 l of water per kg of gel used. These decontamination effluents, when radioactive decontamination is involved, must be treated in existing installations for treating nuclear material. This therefore requires in-depth studies on the management of these effluents and on their impact with regard to the treatment circuits of the installations. Furthermore, such gels which have to be rinsed cannot be used for treating installation surfaces which must not be flooded.

Application WO 03/008529, filed jointly by CEA and COGEMA and published on 20 Jan. 2003, describes a process and a gel for treatment, especially for decontamination. The composition of this gel has been determined so that it can be easily applied to the surface to be decontaminated, then after complete drying for a few hours, removed, with the radioactivity that it has retained, by simple brushing or vacuuming. This gel is composed of a colloidal solution comprising from 5 to 15 wt % of silica relative to the weight of the gel, from 0.5 to 4 mol/l of an inorganic acid or of a mixture of inorganic acids, and, optionally, from 0.05 to 1 mol/l of an oxidizer having a standard redox potential $E_0$ greater than 1.4 V in a strong acid medium or of the reduced form of this oxidizer. The surface-treatment method described in said document comprises an application of the gel onto the surface to be treated, keeping the gel on this surface until it has dried, and removal of the dry gel residues by vacuuming or brushing.

The objective of the present invention is to further improve the gel and the process described in the latter document. In particular, the inventors have observed that the gel described in said document has a certain number of drawbacks: its viscosity and its drying rate are not always well controlled, its spraying is not always easy, cracking of the gel on the surface is not well controlled (dry gel residues that are too large), and certain dry gel residues strongly adhere to the support and are difficult to vacuum or brush.

SUMMARY OF THE INVENTION

The present invention achieves the aforementioned objective by means of a gel composed of a colloidal solution, characterized in that it comprises:

- from 5 to 25 wt % of an inorganic viscosity modifier relative to the total weight of the gel;.
- from 0.01 to 0.2 wt % of a surfactant relative to the total weight of the gel, and, particularly preferably, a surfactant in an amount strictly below 0.1 wt % relative to the total weight of the gel;
- from 0.5 to 7 mol, per liter of gel, of an inorganic acid or base; and
- optionally from 0.05 to 1 mol, per liter of gel, of an oxidizer having a standard redox potential $E_0$ greater than 1.4 V in a strong acid medium or of the reduced form of this oxidizer;
- the remainder being water.

Figure 1:
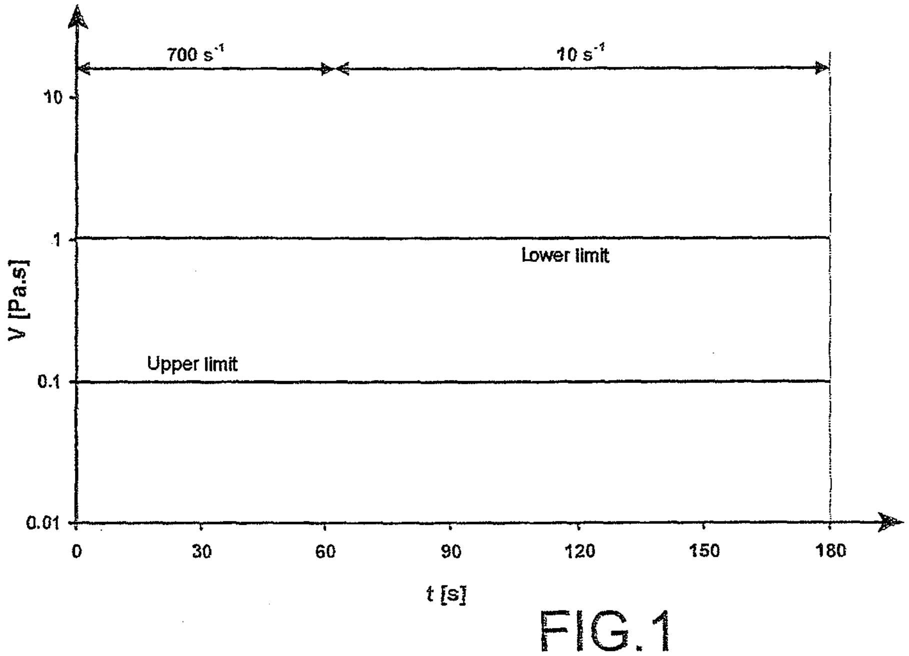
FIG. 1: Minimum and maximum viscosity (V) values of the gels of the present invention set by the inventors as a function of the shear rate.

In these figures, "V" represents the viscosity in Pa·s; "t" represents the time in seconds (s); and "Cor" represents the corrosion observed in μm.

DETAILED DESCRIPTION OF THE INVENTION

The gel of the present invention is aqueous; it may be acidic or basic, oxidizing or reducing. It may be used for radioactive decontamination of surfaces and results, after complete drying for several hours, generally from 2 to 72 hours, at a temperature between 15° C. and 30° C. and a relative humidity between 20 and 70%, in a solid dry residue which has an excellent ability to be detached from the support. This gel is therefore referred to as a "vacuumable gel".

The drying time may be further reduced, for example by means of ventilation, for example with air. With a ventilation of 230 $m^3$/hour, the drying time may be reduced for example to 48 hours or less, and with a ventilation of 900 $m^3$/hour, the drying time may be reduced for example to 24 hours or less.

The term "viscosity modifier" is understood to mean a viscosity modifier or a mixture of viscosity modifiers.

The viscosity modifier is preferably inorganic. It may be, for example, alumina or silica.

When the viscosity modifier is based on silica, or on a mixture of silicas, this silica may be hydrophilic or hydrophobic. Moreover, it may be acidic or basic. It may be, for example, TIXOSIL 73 (trademark) silica sold by Rhodia. Preferably, according to the invention, the silica is at a concentration of 5 to 25 wt % of the gel in order to ensure, more, effectively still, drying of the gel at a temperature of 20° C. to 30° C. and a relative humidity of 20 to 70% on average in 2 to 72 hours.

Among the acidic silicas that can be used, mention may be made, by way of example, of the "Cab-O-Sil" M5, H5 or EH5 (trademarks) fumed silicas sold by Cabot and the fumed silicas sold by Degussa under the name AEROSIL (trademark). Among the fumed silicas, AEROSIL (trademark) silica which offers the maximum viscosity-modifying properties for a minimum mineral loading is preferred.

The silica used may also be what is called precipitated silica obtained by a wet route by mixing a solution of sodium silicate with an acid. The preferred precipitated silicas are sold under the name SIPERNAT 22 LS and FK 310 (trademarks).

According to one particularly advantageous embodiment of the present invention, the viscosity modifier may be a mixture of a precipitated silica and a fumed silica. This is because such a mixture improves the drying of the gel and the particle size of the dry residue obtained. Advantageously, the mixture of the fumed and precipitated silicas represents from 5 to 25 wt % of the gel. This makes it possible to ensure drying of the gel at a temperature of 20° C. to 30° C. and a relative humidity of 20 to 70% on average in 2 to 72 hours. For example, the addition of 0.5 wt % of a precipitated silica, for example FK 310 (trademark) to a gel containing 8 wt % of fumed silica, for example AEROSIL 380 (trademark), increases the particle size of the dry residue (Example 2 below) and results, after drying, in dry residues of millimeter-scale size that facilitate recovery by brushing or vacuuming.

When the viscosity modifier is based on alumina ($Al_2O_3$) it may be obtained, for example, by high-temperature hydrolysis. By way of example, mention may be made of the product ALUMINE C (trademark) sold by Degussa. Preferably, the alumina represents from 10 to 25 wt % of the gel. Specifically, these concentrations make it possible to ensure an even more effective drying of the gel at a temperature of 20° C. to 30° C. and a relative humidity of 20 to 70% on average in 2 to 72 hours.

According to the invention, the term "a surfactant" is understood to mean a single surfactant or a mixture of two or more surfactants. Thus, according to the invention, added to the gels described in document WO 03/008529 is, in an original manner, a very small amount of a surfactant, or a specific surface-active agent, of less than 2 g per kg of gel, generally ranging from 0.01 to 0.2 wt % relative to the total weight of the gel. Preferably, the amount of surfactant in the gel according to the invention is strictly below 0.1 wt % relative to the total weight of the gel and, more particularly, this amount extends from 0.01 to 0.1 wt % relative to the total weight of the gel, the value 0.1 wt % not being inclusive. Advantageously, the values 0.2 wt % and 0.1 wt % are excluded from the ranges relating to the surfactants within the context of the present invention.

According to the invention, the surfactant may be a surfactant or a mixture of surfactants having one or more of the following properties: wetting, emulsifying, detergent. Thus, according to the invention, the surfactant(s) used may advantageously be chosen from the families of wetting surfactants, emulsifying surfactants and detergent surfactants. It may be a mixture of various surfactants belonging to one or more of these families. Preferably, one or more surfactants will be chosen that are stable in the composition of the gel of the present invention, especially at the pH of the gel which may be very acidic or very basic. Given that the present invention relates to gels, it is of course preferred to use one or more surfactants that do not foam, or foam very little.

Among the wetting surfactants that can be used in the present invention, mention may be made, for example, of alcohol alkoxylates, alkylaryl sulphonates, alkylphenol ethoxylates, block polymers based on ethylene oxide or propylene oxide (for example, IFRALAN P8020 (trademark)), light ethoxylated alcohols (for example, MIRAVON B12DF (Rhodia) (trademark)), ether phosphates, or a mixture of the latter.

Among the emulsifying surfactants that can be used in the present invention, mention may be made, for example, of heavy ethoxylated acids, glycerol esters, heavy ethoxylated alcohols (for example, SIMULSOL 98 (SEPPIC) (trademark)), imidazolines, quats (for example, DEHYQUART SP (Sidobre Sinnova) (trademark)), or a mixture of the latter.

Among the detergent surfactants that can be used in the present invention, mention may be made, for example, of alkanolamides or amine oxides (for example, OXIDET DMC-LD (Kao Corporation) (trademark)), or a mixture of the latter.

The preferred surfactants are those whose trademarks are cited in the present application (Statement of the invention and Examples).

A mixture of two or more of the various aforementioned surfactants may also be used.

In addition to the advantages cited in Application WO 03/008529 and that are linked to the use of a gel for treating a surface, the addition of a surfactant according to the present invention unexpectedly makes it possible to augment the viscosity recovery of the gel, a favourable effect for preventing the gel from running down a wall (improvement of the rheological properties of the gel: see Example 1 below). This addition also allows, unexpectedly, a better control of the drying rate of the gel, accelerating or retarding the drying kinetics (see Example 2 below). It also allows, unexpectedly, control of the cracking phenomenon at the surface of the gel during drying: the cracking is more homogeneous and results in an increased homogeneity of the size of the solid residues (see Example 3 below). This makes it possible to avoid obtaining, after drying, residues of too large a size which could be preferentially detached and disperse radioactivity. Finally, the addition of a surfactant unexpectedly makes it possible to increase the ability of the solid gel residues obtained after drying to be detached from the support (see Example 4 below).

In a first embodiment of the present invention, the gel may comprise an inorganic acid or a mixture of inorganic acids. In this case, this acid or this mixture is preferably present at a concentration of 1 to 4 mol per liter of gel. Specifically, these concentrations advantageously make it possible to ensure drying of the gel at a temperature of 20° C. to 30° C. and a relative humidity of 20 to 70% on average in 2 to 72 hours.

According to the invention, the inorganic acid may be chosen, for example, from hydrochloric acid, nitric acid, sulphuric acid, phosphoric acid or a mixture thereof.

According to this first embodiment, the viscosity modifier is preferably silica or a mixture of silicas as defined above.

In a second embodiment of the present invention, the gel may comprise an inorganic base or a mixture of inorganic bases. In this case, the base is preferably present at a concentration below 2 mol/l of gel, preferably from 0.5 to 2 mol/l, more preferably from 1 to 2 mol/l in order to advantageously ensure drying of the gel at a temperature of 20° C. to 30° C. and a relative humidity of 20 to 70% on average in 2 to 3 hours.

According to the invention, the base may be chosen, for example, from sodium hydroxide, potassium hydroxide or mixtures thereof.

According to this second embodiment, the viscosity modifier is preferably alumina.

Finally, the gel of the invention may contain an oxidizer that has a standard redox potential greater than 1400 mV in a strong acid medium, that is to say an oxidizing ability greater than that of permanganate. By way of example, such oxidizers may be Ce(IV), Co(III) and Ag(II). According to the invention, the oxidizer concentration in the gel is preferably from 0.5 to 1 mol/l of gel.

The oxidizers, among which cerium IV is preferred, are preferably combined with an inorganic acid, for example nitric acid, at a moderate concentration, that is to say below 3 mol/l, that allows rapid drying of the gel as defined above. Cerium is generally introduced in the form of electrogenerated cerium (IV) nitrate $Ce(NO_3)_4$ or ceric ammonium nitrate $(NH_4)_2Ce(NO_3)_6$.

Thus, a typical example of an oxidizing gel for decontamination according to the invention is composed of a colloidal solution comprising, besides the surfactant in the concentrations of the invention, from 0.1 to 0.5 mol/l of $Ce(NO_3)_4$ or $(NH_4)_2Ce(NO_3)_6$, from 0.5 to 2 mol/l of a strong acid, for example nitric acid, and from 5 to 15 wt % of silica.

The gels of the invention may easily be prepared at ambient temperature, for example by adding, to an aqueous decontaminating solution of the prior art, the mineral viscosity modifier which preferably has a high specific surface area, for example greater than 100 $m^2/g$, then the surfactant or surfactants in order to obtain a gel according to the present invention.

Generally, it is preferred that the gel has a viscosity at least equal to 1 Pa·s and a recovery time of less than one second in order to be able to be applied to the surface to be decontaminated without running, at a distance (for example, at a distance of 1 to 5 m) or close up (distance of less than 1 m, preferably of 50 to 80 cm).

The present invention also relates to a process for decontaminating a surface characterized in that it comprises at least one cycle comprising the following successive steps:

(a) application of the gel of the invention onto the surface to be decontaminated;

(b) keeping the gel on said surface at a temperature of 20 to 30° C. and a relative humidity of 20 to 70% for a duration of 2 to 72 hours, so that it forms a dry solid residue; and (c) removal of the dry solid residue from the thus decontaminated surface.

In other words, one cycle comprises the steps (a), (b) and (c), and several cycles may be repeated successively, until the desired decontamination is attained.

When the contaminants are radioactive, the process of the present invention is a radioactive decontamination process.

According to the invention, the gel may be applied to the surface to be decontaminated, for example in an amount of 100 to 2000 g of gel per $m^2$ of surface, preferably 100 to 1000 $g/m^2$. These are proportions that allow good decontamination without needless waste.

According to the invention, the gel may be applied to the surface to be decontaminated by any means known to a person skilled in the art. The most suitable current means seem however to be application by spraying, for example using a spray gun, or application using a brush.

In order to be applied to the surface by spraying, the gel of the present invention (colloidal solution) may, for example, be conveyed by means of a low-pressure pump, for example by using a pressure below $7\times10^5$ Pa. The blowing of the gel jet onto the surface may be obtained, for example, by means of a flat-jet or round-jet nozzle. The distance between the pump and the nozzle may be any, for example from 1 to 50 m, for example 25 m.

The sufficiently short recovery time of the viscosity, due to the composition of the gel of the present invention, allows the gel to adhere to the wall, even when it is sprayed.

According to the invention, the drying time of the gel is from 2 to 72 hours due to the composition of the gel of the present invention and to the aforementioned drying conditions.

According to the invention, when the gel is dry, the dry solid residues of the gel may be removed easily from the decontaminated surface, for example by brushing and/or by vacuuming.

The process of the invention may comprise a prior step of dusting the surface to be decontaminated. Thus, the process of the invention may comprise an additional step of dusting said surface to be decontaminated, followed by a decontamination of the dusted installation by means of the process of the invention.

The dusting may consist, for example, of a precleaning of the surface to be decontaminated, for example by blowing or vacuuming the dust, in order to remove the unattached solid contamination.

Next, the decontamination process of the invention is applied so as to remove the contamination attached to the surface. The gel of the present invention dries completely after having acted on the surface and is easily detached from the wall by vacuuming or brushing.

The process of the present invention finds, most particularly, an advantage in and relates to the decontamination of nuclear installations, for example of the ventilation shafts of nuclear installations.

The process of the present invention applies especially to the decontamination of metallic surfaces, advantageously when they are large, both within the context of the periodic maintenance of existing installations and during the clean-up and/or dismantling of nuclear installations.

The surfaces in question are not necessarily horizontal, but may be sloped or even vertical. This process is applied to any type of surface, especially to metallic surfaces, contaminated by grease, by a very adherent or bulk oxide layer or by other radioactive or non-radioactive contaminants.

The gels according to the invention may be used, for example, to decontaminate tanks, ventilation shafts, storage pools, glove boxes, etc.

It is obvious that the surface treatment could be repeated several times (several cycles), successively, with the same gel or with different gels, preferably according to the present invention.

Due to the low-concentration surfactant, drying of the gel is improved and results in a homogeneous cracking phenomenon. The size of the dry residues is monodisperse and the ability of the residues to be detached from the support is increased compared to the gels of the prior art. Moreover, as the examples below show, the inventors have observed that the presence of surfactant(s) according to the present invention sometimes renders the gel more effective for the surface treatment.

Thus, no rinsing with water is necessary and the process does not generate any secondary effluent. The dry residue obtained after drying may be easily removed, preferably by brushing or vacuuming, but also by a jet of gas, for example a jet of compressed air.

With the present invention, the advantages of the vacuumable gels from the prior art are retained and improved: the conventional gel-rinsing operation using water is avoided, and liquid effluent that has to be subsequently treated is no longer produced. This results in a simplification in terms of the overall route for treating the contamination.

Besides the many aforementioned advantages, the inventors have shown that the gels of the present invention may be more easily applied to the surface to be decontaminated by spraying or using a brush, then after complete drying in a few hours, more easily removed with the radioactivity that they have retained by simple brushing or vacuuming.

Other features and advantages of the invention will appear more clearly on reading the following examples given, of course, by way of illustration and non-limitingly.

EXAMPLES

Example 1

A reference gel was prepared comprising AEROSIL (8 wt %), 0.1M $HNO_3$ and 1.5M $H_3PO_4$.

In this example, the usage conditions of the gel for its drying were the following: 22° C. and 40% relative humidity.

In order to be able to spray the gel at low pressure, the viscosity limit was set to 100 mPa·s under high shear (700 $s^{-1}$). In order to attain a gel that did not run down the wall, a viscosity greater than 1 Pa·s under low shear (10 $s^{-1}$) was necessary.

This can be expressed graphically by means of the rheogram represented in FIG. 1.

The viscosity of the gels must preferably be in the blank zones of the graph which guarantee an easy use of the gel.

The addition of surfactants in a small amount according to the present invention makes it possible to optimize the rheological properties of the vacuumable gels of the prior art.

Figure 2:
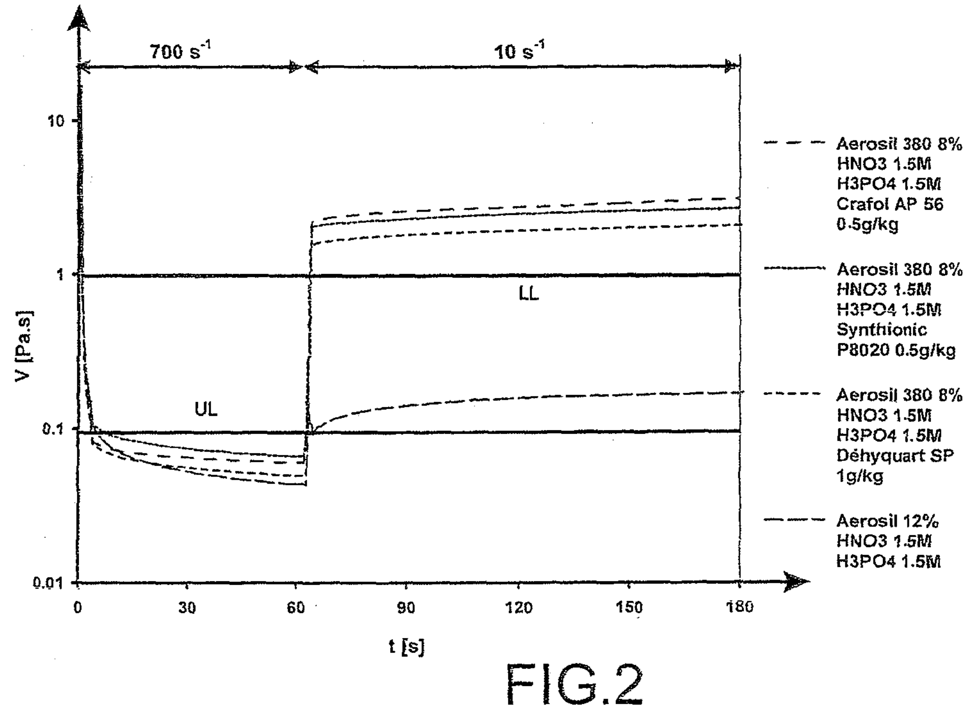
FIG. 2: Rheogram of gels that do not contain surfactants (prior art) and of gels that contain surfactants according to the present invention: variation in the viscosity (V) as a function of time (s).

FIG. 2 represents the rheograms obtained for various acidic gels containing various surfactants (CRAFOL AP56, SYNTHIONIC P8020 and DEHYQUART 5P (trademarks)) having 1 g/kg of active material and having only 8% of silica. The various gel compositions studied are indicated in this figure.

By way of comparison, the rheogram of an acidic gel of the prior art, that is to say without surfactant, is also represented in this figure.

It is observed, on this figure, that the incorporation of a surfactant to the gel formulation surprisingly makes it possible, while decreasing the silica loading, to attain the defined viscosity criteria. Specifically, the viscosity of the gels with surfactants is below 100 mPa·s under a high shear and greater than 1 Pa·s under a low shear.

The presence of surfactants in the silica gels according to the present invention considerably improves their rheological behaviour, irrespective of the electrical charge of the surfactant (1, 0 or −1). The electrical charge is therefore not a sufficient criterion for choosing a surfactant.

Although the surfactants were chosen in this example for being stable in acid medium, even still they have a tendency to be degraded in the highly acidic conditions used here.

It is therefore preferable to check the behaviour of the surfactants in the gel in order to determine the shelf life of the gel and to know whether they may be prepared in advance or at the time of their use.

Figure 3:
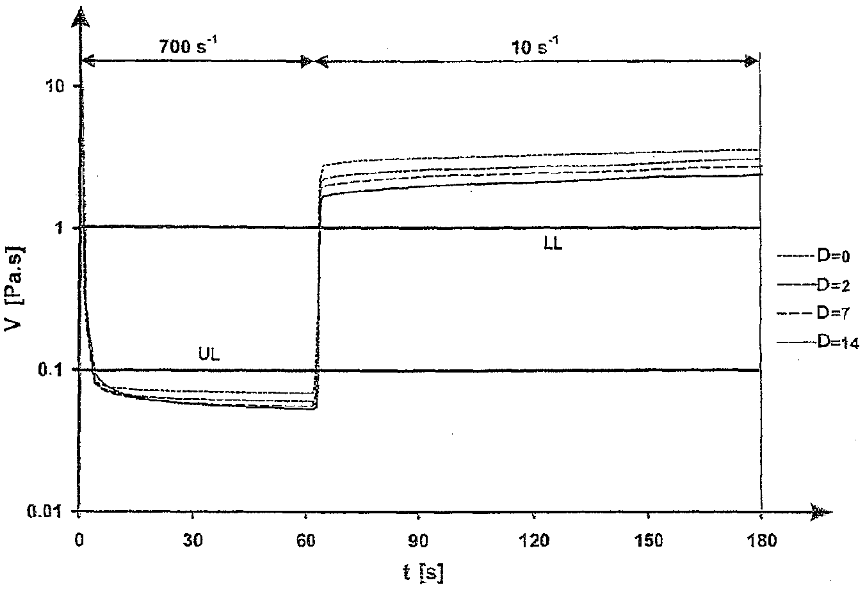
FIG. 3: Influence of ageing on the viscosity of the gel of the present invention: variation in the viscosity (V) as a function of time (s).

The rheograms of the gels are traced at given ageing times (0 to 14 days). FIG. 3 shows the rheological behaviour of a gel containing a surfactant (CRAFOL AP56 (trademark)) at times D=0, D=2, D=7 and D=14 days. In this figure, the influence of the ageing on the viscosity of the gel of the present invention is shown: variation of the viscosity (V) as a function of time (s).

It is observed in the case of CRAFOL AP56 (trademark) that the viscosity under high and low shear decreases with the age of the gel. But this does not prevent the use of this type of gel for a duration of at least fifteen days.

Finally, the study of the ageing of the gels has been extended to surfactants other than those described previously.

Table I below gives a review of the trials carried out with the surfactants chosen during the laboratory formulation trials.

It is observed, from the values of this table, that CRAFOL (trademark) is not a special case.

Among the surfactants tested, several meet the criteria required for good spraying, especially DEHYQUART SP and SYNTHIONIC P8020 (trademarks).

TABLE I

| Surfactant | Amount of active material [g/kg] | Viscosity in mPa · s at T = 22° C. D0 700 $s^{-1}$ | D0 10 $s^{-1}$ | D1 700 $s^{-1}$ | D1 10 $s^{-1}$ | D2 700 $s^{-1}$ | D2 10 $s^{-1}$ | D7 700 $s^{-1}$ | D7 10 $s^{-1}$ | D14 700 $s^{-1}$ | D14 10 $s^{-1}$ |
|---|---|---|---|---|---|---|---|---|---|---|---|
| Antarox FM33 | 0.71 | 43 | 885 | 33 | 717 | 40 | 676 | 39 | 564 | — | — |
| Antarox BL8 | 0.74 | 39 | 669 | 34 | 485 | 35 | 447 | 34 | 355 | — | — |
| Orafol AP56 | 1.05 | 69 | 2759 | 60 | 2183 | 54 | 1995 | 53 | 1685 | 49 | 1442 |
| Dehyquart SP | 0.55 | 50 | 1574 | — | — | 45 | 1277 | — | — | 40 | 1197 |
| Dehyton AB30 | 0.48 | 26 | 225 | 27 | 165 | 28 | 162 | 30 | 132 | — | — |
| Lutensit A-EP | 0.64 | 35 | 783 | 31 | 454 | 30 | 378 | 30 | 281 | — | — |
| Miravon B12DF | 0.60 | 35 | 697 | 30 | 428 | 31 | 372 | 32 | 292 | — | — |
| Rewopal X1207L | 0.89 | 43 | 949 | 43 | 819 | 40 | 719 | 42 | 648 | — | — |
| Simulsol NW342 | 0.82 | 47 | 944 | 40 | 751 | 42 | 715 | 41 | 619 | — | — |
| Synthionic P8020 | 0.54 | 66 | 2052 | — | — | 53 | 1369 | — | — | 48 | 1292 |

Example 2

Effect of the Surfactant on the Drying Time of the Gel

In this example, the presence of SYNTHIONIC or ANTAROX (trademarks) in an amount of 0.1% was tested in 1.5 M to 3.5 M phosphonitric acid gels comprising 10 wt % of AEROSIL 380 (trademark).

In the gel, the surfactant molecules were positioned at the gel/air and silica/solution interfaces in order to minimize the contacts with the water molecules. The surface of the gel was therefore covered with surfactant molecules which could slow down the evaporation or accelerate it.

Figure 4:
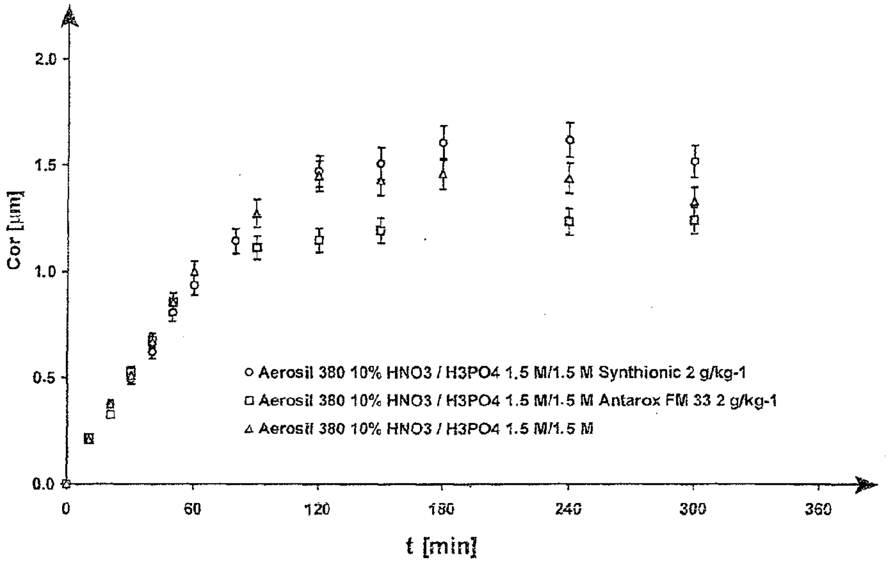
FIG. 4: Corrosion rates obtained on aluminium samples treated by acidic or basic gels that do or do not contain a surfactant according to the present invention.

As regards the effectiveness of the gels, FIG. 4 represents the corrosion kinetics obtained, on aluminium samples treated by the acid gel, the acid gel containing ANTAROX (trademark) at 2 g/kg and the acid gel containing SYNTHIONIC (trademark) at 2 g/kg.

The operating conditions were the following: 22° C. and 40% relative humidity.

The experimental results show that the presence of SYNTHIONIC or ANTAROX (trademarks) increases the drying time by around 30 minutes to one hour for the acid gels.

The corrosion kinetics from FIG. 4 show that the gels according to the present invention, that is to say containing a surfactant, are overall as effective as the model acid gel, sometimes more effective.

Example 3

Effect of the Surfactant on Cracking

Figure 5:
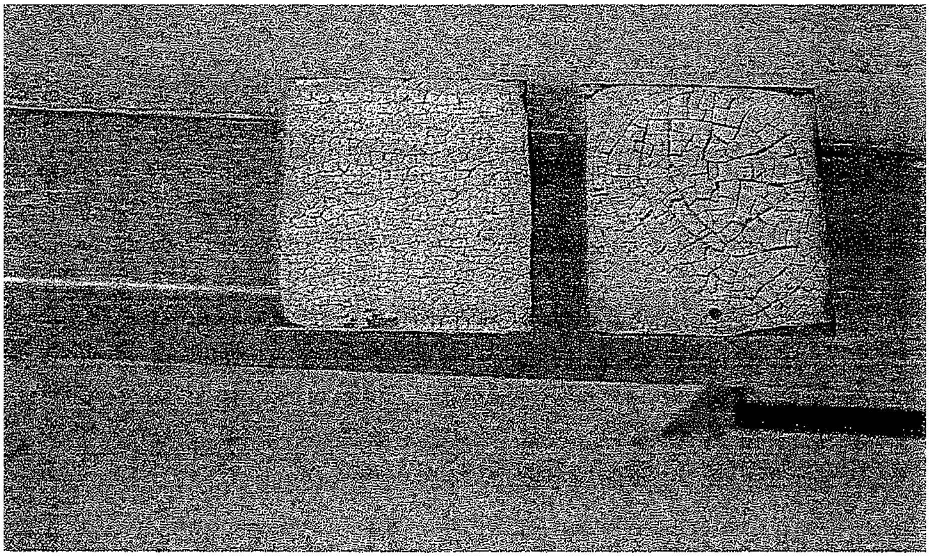
FIG. 5: Photograph allowing a visual comparison of a gel according to the present invention (on the left) and of a gel of the prior art, that is to say without surfactant (on the right).

FIG. 5 is a photograph allowing a visual comparison of a gel according to the present invention (on the left) and a gel of the prior art, that is to say without surfactant (on the right) dried under the same temperature, humidity and time conditions.

An oxidizing gel film containing 0.5M cerium and 3M nitric acid (right-hand reference in the photo) was prepared on a sample made of stainless steel. 1 g/kg of wetting surfactant SYNTHIONIC P8020 was added to the gel composition (left-hand sample).

The cracking obtained at the surface of the gel containing the surfactant on the left was more homogeneous. The size of the solid residues was monodisperse (1 to 2 mm) (present invention).

This avoided the formation observed on the right (prior art) of a polydispersity of the size of the larger solid residues (5 to 7 mm) that are more difficult to recover as they are more adherent.

Example 4

Effect of the Surfactant on the Adhesion of the Dry Gel to a Surface 800 g/m$^2$ of three gels containing 20% of TIXOSIL (trademark) and 1.5 M of phosphoric acid, the first without surfactant, the second with 0.1% of DEHYQUART SP (trademark) and the third with 0.1% of SYNTHIONIC 8020 (trademark) were deposited in the form of a film on mild steel, at 22° C. and 40% humidity.

After drying for 3 hours at 22° C., with a relative humidity of 40% and a flow of air at a speed of 0.1 m/s, the samples were turned over in order to make the dry residues drop off under the effect of gravity.

Only 5% of the dry residues were detached without surfactant, 15% with the DEHYQUART (trademark) and 20% with the SYNTHIONIC (trademark).

The surfactant of the gel of the present invention therefore definitely promotes the detachment of the solid residue, which is very important for cleaning the treated surface and for facilitating the recovery of the dry gel residues, especially in a radioactive decontamination.

Example 5

Effect of the Surfactant on the Degreasing Properties of the Gel

A degreasing alkaline gel containing 15 g of alumina mixed with 100 ml of 1 mol/l sodium hydroxide was prepared.

A degreasing test was carried out with the prepared gel on a sheet coated with lanolin.

After 24 hours the dry gel without surfactant was sucked up but the sheet was not degreased.

2 g/l of a nonionic surfactant of the REWOPAL X 1207 L (trademark) type according to the present invention were added. The effectiveness of the degreasing was brought to 8% after one hour, 43% after 3 hours and 74% of the grease was removed after 24 hours.

Example 6

Effect of the Surfactant on the Radioactive Decontamination Properties of the Gel Two cerium-containing oxidizing gels were prepared and tested for decontaminating a stainless steel contaminated cell.

The first gel contained silica of AEROSIL (trademark) type, 3M nitric acid and 0.33M ceric ammonium nitrate. The second was identical to the first, but in addition contained 1 g/l of SYNTHIONIC (trademark) surfactants.

The two gels were applied using a brush to two 400 cm$^2$ radioactively contaminated surfaces, one on the ground (2.2 mGy/h) and the other on the wall (1 mGy/h).

After a single pass of the gel and drying for 24 hours, the gel containing the surfactant was more easily removed by simple brushing than the gel without surfactant.

For the gel containing the surfactant, the contamination on the ground was only 0.4 mGy/h and 0.2 on the wall. The contamination was divided by a factor of 5.5, whereas for the gel without surfactant, the decontamination factor was only 5.

The invention claimed is:

1. A gel consisting of:

from 5 to 25 wt % of an inorganic viscosity modifier relative to the total weight of the gel;

a surfactant in an amount ranging from 0.01 to 0.1 wt % relative to the total weight of the gel, the value 0.1 wt % not being inclusive;

from 0.5 to 7 mol/l of gel of an inorganic acid, of a mixture of inorganic acids, of an inorganic base or of a mixture of inorganic bases;

optionally from 0.05 to 1 mol/l of gel of an oxidizer having a standard redox potential $E_0$ greater than 1.4 V in a strong acid medium or of the reduced form of this oxidizer; and water, wherein the surfactant is chosen from the group consisting of alcohol alkoxylates, alkylaryl sulphonates, alkylphenol ethoxylates, block polymers based on ethylene oxide or propylene oxide, ether phosphates, glycerol esters, imidazolines, quats, alkanolamides, amine oxides, and mixtures thereof, and wherein said gel results, after complete drying from 2 to 72 hours, at a temperature between 10° C. and 30° C. and a relatively humidity between 20 and 70%, in a solid dry residue.

2. The gel according to claim 1, wherein the inorganic viscosity modifier is silica.

3. The gel according to claim 2, wherein the silica is selected from the group consisting of fumed silica, precipitated silica, and a mixture of fumed silica with precipitated silica.

4. The gel according to claim 1, wherein the inorganic viscosity modifier is a mixture of fumed silica and precipitated silica.

5. The gel according to claim 1, wherein the inorganic viscosity modifier is a mixture of fumed silica and precipitated silica, and the precipitated silica represents 0.5 wt % of the gel and the fumed silica represents 8 wt % of the gel.

6. The gel according to claim 1, wherein the inorganic viscosity modifier is alumina, which represents from 10 to 25 wt % of the gel.

7. The gel according to claim 1, wherein the inorganic acid or a mixture of inorganic acids is present at a concentration of 1 to 4 mol/l of gel.

8. The gel according to claim 1, wherein the inorganic acid is selected from the group consisting of hydrochloric acid, nitric acid, sulphuric acid, phosphoric acid, and a mixture thereof.

9. The gel according to claim 1, wherein the inorganic base or the mixture of inorganic bases is present at a concentration of 0.5 to 2 mol/l of gel.

10. The gel according to claim 9, wherein the inorganic base is selected from the group consisting of sodium hydroxide, potassium hydroxide, and a mixture thereof.

11. The gel according to claim 1, wherein the oxidizer is present at a concentration from 0.5 to 1 mol/l and has a standard redox potential $E_0$ greater than 1400 mV in a strong acid medium chosen from Ce(IV), Co(III), or Ag(II).

12. The gel according to claim 1, wherein the inorganic viscosity modifier is from 5 to 15 wt % of silica, wherein the inorganic acid is from 0.5 to 2 mol/l of strong acid, and wherein the oxidizer is from 0.1 to 0.5 mol/l of gel of $Ce(NO_3)_4$ or $(NH_4)_2Ce(NO_3)_6$.

13. The gel according to claim 1, wherein the surfactant is a single surfactant or a mixture of surfactants having one or more of the following properties: wetting, emulsifying, and/or detergent.

14. A process for decontaminating a surface, comprising the following successive steps:

(a) applying the gel according to claim 1 onto the surface to be decontaminated;

(b) keeping the gel on said surface at a temperature of 20 to 30° C. and a relative humidity of 20 to 70% for a duration of 2 to 72 hours so that it forms dry solid residues on said surface; and (c) removing the dry solid residues from the thus decontaminated surface.

15. The process according to claim 14, wherein the gel is applied to the surface to be decontaminated in an amount of 100 to 2000 g of gel per $m^2$ of surface.

16. The process according to claim 14, wherein the gel is applied to the surface to be decontaminated by spraying or using a brush.

17. The process according to claim 14, wherein the dry solid residues of the gel are removed from the decontaminated surface by brushing and/or by vacuuming.

18. The process according to claim 14, wherein said process further comprises a prior step of dusting said surface to be decontaminated.

19. The process according to claim 14, wherein said process concerns the decontamination of nuclear installations, for example of the ventilation shafts of nuclear installations.

20. The process according to claim 14, wherein the decontamination is a radioactive decontamination.

* * * * *